United States Patent [19]

Eder et al.

[11] Patent Number: 5,215,762
[45] Date of Patent: Jun. 1, 1993

[54] NOZZLE FOR INJECTION MOLDING MACHINE

[75] Inventors: Erich Eder, Neu-Isenburg; Josef Kranitz, Schoneck, both of Fed. Rep. of Germany

[73] Assignee: Kloeckner-Ferromatik Desma GmbH, Malterdingen, Fed. Rep. of Germany

[21] Appl. No.: 730,592

[22] Filed: Jul. 16, 1991

[30] Foreign Application Priority Data

Jul. 16, 1990 [DE] Fed. Rep. of Germany ....... 4022530

[51] Int. Cl.⁵ .............................................. B29C 45/23
[52] U.S. Cl. ................................ 425/130; 264/328.8; 425/564; 425/566
[58] Field of Search ................. 264/328.8, 328.13; 425/562, 563, 564, 565, 566, 573, 130

[56] References Cited

U.S. PATENT DOCUMENTS

| 5,071,341 | 12/1991 | Poehlsen | 425/562 |
| 5,078,589 | 1/1992 | Osuna-Diaz | 425/562 |

FOREIGN PATENT DOCUMENTS

| 311875 | 10/1988 | European Pat. Off. | |
| 2342789 | 8/1973 | Fed. Rep. of Germany | |
| 2346135 | 9/1973 | Fed. Rep. of Germany | |
| 2445112 | 9/1974 | Fed. Rep. of Germany | |
| 2705291 | 2/1977 | Fed. Rep. of Germany | |
| 2716570 | 10/1977 | Fed. Rep. of Germany | 425/130 |
| 1290262 | 3/1961 | France | |
| 85431 | 3/1964 | France | 425/130 |
| 60-174622 | 9/1985 | Japan | 425/130 |

Primary Examiner—Tim Heitbrink
Attorney, Agent, or Firm—Watson, Cole, Grindle & Watson

[57] ABSTRACT

A nozzle for an injection molding machine with a common nozzle outlet chamber to control the injection of at least two plasticized plastic components in a mold, where each plastic component is produced in a separate plasticizing unit and each such unit is connected by the shortest path to at least one separate nozzle inlet which in turn is connected within the nozzle by means of a separate channel to the common nozzle outlet chamber. Each channel is provided with its own shutoff valve that can be actuated independently in such a manner that each infeed channel extends from its nozzle inlet in a straight line to the related shutoff valve, and from it in turn over an outfeed channel in a straight line to the common nozzle outlet chamber. Both longitudinal axes of the output region of the connection from the plasticizing unit and the nozzle inlet forms with the longitudinal axis of the infeed channel; and the longitudinal axis of the infeed channel forms with the longitudinal axis of the outfeed channel; and the longitudinal axis of the outfeed channel forms with the axis of symmetry of the common nozzle outlet chamber; respective angles ranging from 140° to 180°.

12 Claims, 2 Drawing Sheets

NOZZLE FOR INJECTION MOLDING MACHINE

BACKGROUND OF THE INVENTION

This invention relates to a nozzle for an injection molding machine for simultaneously injecting at least two plasticized materials into the mold of the machine.

Such injection nozzles are provided to either produce multicolored injection molded plastic articles wherein, depending on the process sequence, more or less continuous transitions from one color to another are desired, or to produce injection molded plastic articles with one or more layers, such as an inexpensive core layer and a more costly and attractive surface layer or layers.

Such nozzles are generally disclosed in French patent 1290262, and in German patents 2342789, 2346135 and 2445112. As disclosed therein, the feed channels within each nozzle are directed coaxially at least at the terminal portion of their path to a joint nozzle outlet, where separate valves for each channel are arranged either before reaching the coaxial channel guide in each channel, or are formed by the moveable channel guide elements themselves. These known constructions appear to permit a compact construction of the nozzles, but basically require that the channels within a nozzle have a plurality of bends, because of the desired compactness and because of the minimum spacing between the nozzle inlet specified by the dimensions of the plasticizing units.

Each such bend in flow of plasticized material, however, produces an additional resistance for the plasticized flow property, which plasticized material is connected by a suitable power supply to the conveying device coupled to the plasticizing unit for the particular plastic component. For injection molding machines developed for very large and complicated plastic bodies and which operate with considerable injection pressures, a minimizing of the injection molding intervals to increase product output and produce energy savings would result in noticable cost savings and significantly reduce the environmental impact.

German patent 2705291 dispenses with the nozzle totally, and instead couples the outlet of the plasticizing units directly to a corresponding number of individual inlets of the sprue bushing of the injection molding machine that is embedded in the thermoforming mold and that has only one common outlet for all plastic components with respect to the mold. If necessary, between the plasticizing units and the sprue bushing a nozzle head is provided that apparently contains only individual connecting channels between the plasticizing units and the individual inlets of the sprue bushing. However, the use of one of the aforedescribed arrangements exhibits the drawback that the sprue formed automatically during the production of the molded parts has in the direction of the molded part a relatively large cross section which can be flawlessly removed from the finished molded part only with a great deal of technical complexity and thus also additional cost and additional energy.

European published application 0311875 discloses the use of a sprue bushing which tapers off on the side of the mold to narrow outlet openings, although the flows of plasticized materials are fed first into the lateral cavities which must decelerate and divert the respective flow. In principle, however, the result has the same effect as the aforementioned bent flow channel guides within a nozzle.

SUMMARY OF THE INVENTION

It is therefore an object of the present invention to provide a nozzle for an injection molding machine for injecting at least two plasticized materials into the mold cavity of the machine, and more particularly to provide such a nozzle wherein energy losses of the flow of plasticized material is reduced to a minimum when passing through the nozzle.

According to the invention, the nozzle has a body containing a common nozzle outlet chamber and at least a pair of anularly related elongated bores, outfeed channels extending from the bores and communicating with the outlet chamber. An infeed channel is connected to each of the bores, and each such infeed channel has a nozzle inlet. A separate plasticizing unit is coupled to each inlet for delivering plasticized materials to the chamber via the bores. An independently operable shutoff valve, such as a needle valve, operates in each bore for controlling the flow of plasticized material from each of the bores to the chamber. Each infeed channel extends along a straight line from its inlet to the respective bore, and each outfeed channel extends along a straight line from its respective bore to the common nozzle outlet chamber. The longitudinal axes of each plasticizing unit and the infeed channel connected thereto forms a angle $\alpha$ of 140° to 180°, the longitudinal axes of each infeed channel and the outfeed channel associated therewith forms an angle $\beta$ of 140° to 180°, and the longitudinal axes of each outfeed channel and of the chamber forms an angle $\gamma$ of 140° to 180°.

It has been shown to be especially advantageous if each plasticizing unit is connected by the shortest path to the nozzle inlet or inlets to be fed, and if each infeed channel extends from its nozzle inlet in a straight line to the respective valve shutoff.

The angle $\gamma$ is devised as such because in this manner a laminar flow with minimal frictional losses is capable of being maintained from the plasticizing unit to the shutoff valve. With the angle $\gamma$, at least when no significant turbulent flow has been generated in the shutoff valve, a uniform laminar flow with minimal frictional losses is also maintained from the shutoff valve to the sprue channel. With the angle $\beta$ it is possible to select a known type shutoff valve which permits, at least after suitable adaptation, the flow of the plasticized material to maintain substantially uniform laminar flow with minimum frictional losses even within the shutoff valve, at least during the axial opening and closing operations so that finally for the entire path of the plasticized material from the plasticizing unit to the sprue channel a minimal energy loss and thus a careful flow guide of the material has been effected.

Other objects, advantages and novel features of the invention will become more apparent from the following detailed description when taken in conjunction with the accompanying drawings.

DETAILED DESCRIPTION OF THE INVENTION

Figure 1:
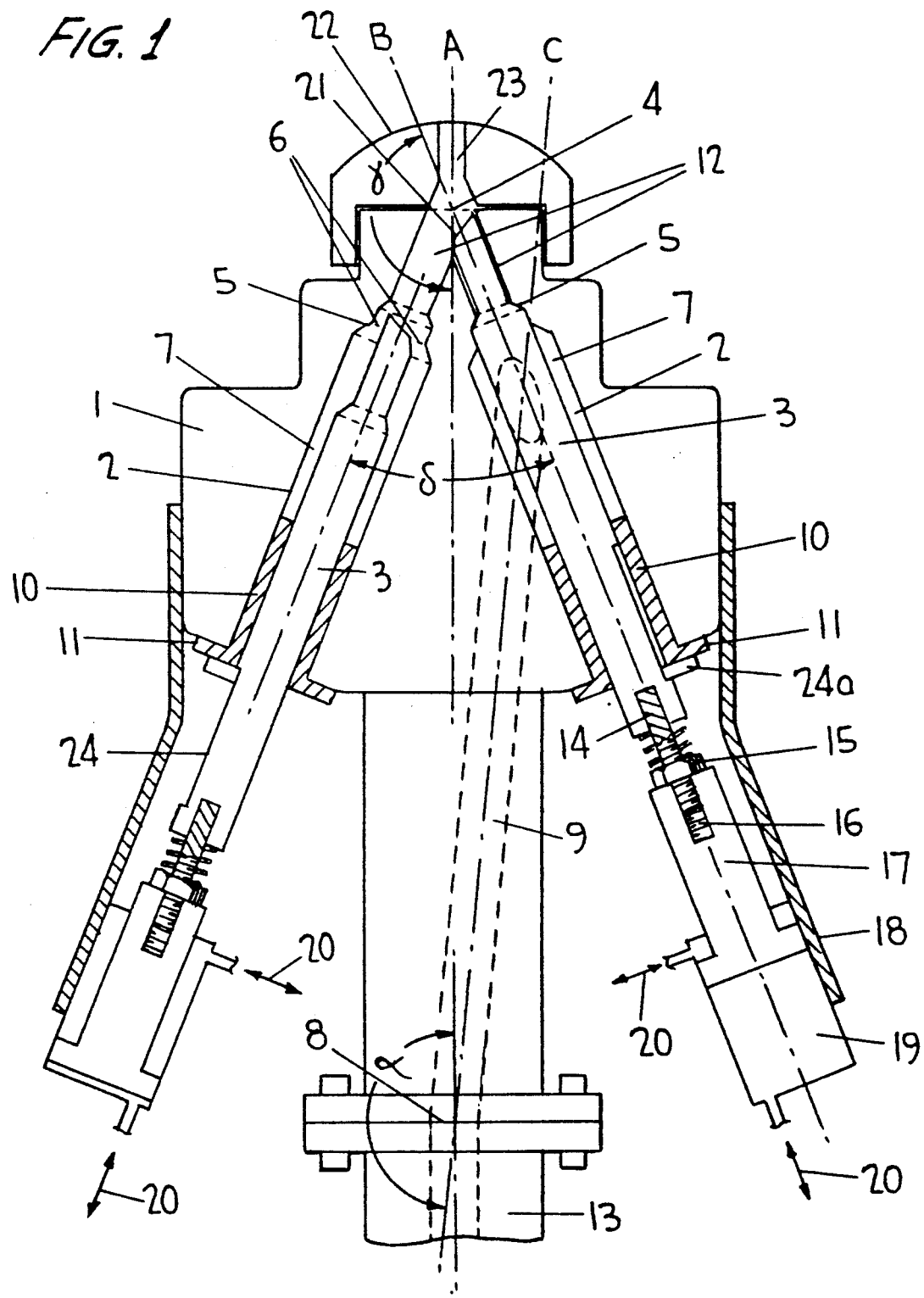
FIG. 1 is a top plan view of the nozzle assembly of the invention taken in the plane of two shutoff valve bores, several components being shown in section.

Nozzle body 1 has at least a pair of angularly related elongated bores 2 of symmetrical V-shaped configuration each containing an axially shiftable shutoff valve which may be in the form of a shutoff valve needle 3. Valve 3 functions together with bore 2 as a shutoff element, one such shutoff needle being shown in an open position (needle valve to the left in FIG. 1) and the other shutoff needle being shown in a closed position (needle valve to the right in FIG. 1).

The bores communicate with a common nozzle outlet chamber 4, and a conical valve seat 5 is provided between each bore and such chamber. The seat, forms, together with shut-off valve 3, an annular opening 6 of variable cross-section. Upstream thereof, each bore forms, together with valve 3, an annular space 7.

A straight line infeed channel 9 opens into each annular space 7 of each bore 2, each infeed channel 9 having a nozzle inlet 8 coupled to a separate plasticizing unit 13.

Each bore 2 contains, upstream of the annular space 7, a replaceable wear bushing 10 for guiding needle valve 3 during sliding movement between its closed and open positions. Each bushing is mounted in place by means of its flange 11.

Each bore 2 communicates with chamber 4 via an outfeed channel 12 lying coaxial with its respective bore, and extending from variable passage opening 6 to chamber 4. Nozzle inlet 8 is connected either directly or by means of a short connecting piece (not shown), which follows a continuous and slightly curved part in space and not explicitly shown, to the outlet of a known type of plasticizing unit 13, shown schematically.

Each shutoff needle valve 3 has, at its outer end, a thread bolt 14 extending along longitudinal axis B of bore 2 and having a lock nut 15 thereon. Bolt 14 extends into a tapped bore 16 of a piston rod 17 which is part of a known type piston-cylinder arrangement 19 operated by a fluid pressure medium and mounted to nozzle body by a support element 18. Pressurizing of the piston-cylinder arrangement with fluid pressure medium is indicated schematically by double arrows 20.

The arrangement comprising thread bolt 14, lock nut 15 and tapped bore 16 in the piston rod allows for a very accurate adjustment of the maximum stroke of the respective shutoff needle valve 3 in a simple manner. The piston-cylinder arrangement 19 for each shut-off valve needle 3 permits each valve needle to be actuated trouble free by means of a control and adjusting device of known type (not shown) independently of the other shutoff needle valve or valves. Such arrangements, namely the arrangement to adjust the shutoff needle stroke and the arrangement to actuate the shutoff needles, can be effected by other known means, without departing from the invention.

Each shutoff valve needle is tapered or chamfered at its inner tip end 21 confronting outlet chamber 4 such that each needle valve, when closed, can each project into chamber 4 without interference from one another.

Also, each needle valve has a longitudinally extending groove 24 on its periphery for the reception of a tongue 24a, shown schematically, to avoid rotation of each needle valve about its longitudinal axis B during sliding movement between its closed and open positions. Also, in such a manner, while a plastic component flows through common nozzle outlet chamber 4 over one shutoff valve needle 3, no residue of a plastic component extruded previously tends to accumulate in front of shaped end 21 of the other shutoff valve needle located in a closed condition.

A nozzle cap 22 is mounted on nozzle body 1, such as by threading, the cap having a nozzle bore 23 communicating with chamber 4 so as to produce a suitable fitting connection of the nozzle with the sprue channel of the mold of the injection molding machine.

The straight line infeed line channel 9 extends along longitudinal axis C from nozzle inlet 8 to annular space 7. The outlet region of plasticizing unit 13 or the region of a connecting piece (not shown) which may be provided between unit 13 and nozzle inlet 8, extends along a longitudinal axis D. Axes C and D are formed at an angle $\alpha$ (FIG. 2) ranging from 140° to 180°. This angle lies in a plane which is unfolded by longitudinal axes C and D, since the visible axes are only three dimentional projections of the actual longitudinal axes of unit 13 or of infeed channel 9.

The projection of the actual longitudinal axis C in the plane of projection forms an angle $\epsilon$ in the plane of projection whose numerical valve ranges from $-10°$, with longitudinal axis A of the nozzle body that lies in the plane of projection, provided both such axes are viewed as extending from the projection from the center point of the nozzle inlet 8 in the plane projection of common nozzle outlet chamber 4 or annular space 7.

Longitudinal axis B of bore 2 and longitudinal axis C of infeed channel 9 form in the plane they unfold and with the plane of projection (since only axis B also extends actually in the plane of projection) an angle $\beta$ in such manner that axis C, extending from nozzle inlet 8 at the intersecting point of both axes forms with axis B the angle $\beta$ ranging from 140° to 180°.

In a corresponding manner axis B extending along a direction of the piston-cylinder arrangement 19 and through outlet chamber 4 forms with central axis A of the nozzle body, an angle $\gamma$ in the plane of projection whose numerical value ranges from 140° to 180°. Longitudinal axes B of both bores 2 form a wedge angle $\delta$ whose numerical value $\delta = 2(180 - \gamma)$ when both illustrated axes B lying in the plane of projection are viewed as extending from chamber simultaneougly in the direction of their respective piston-cylinder arrangement 19 or simultaneously in the direction of the mold of the injection molding machine.

Figure 2:
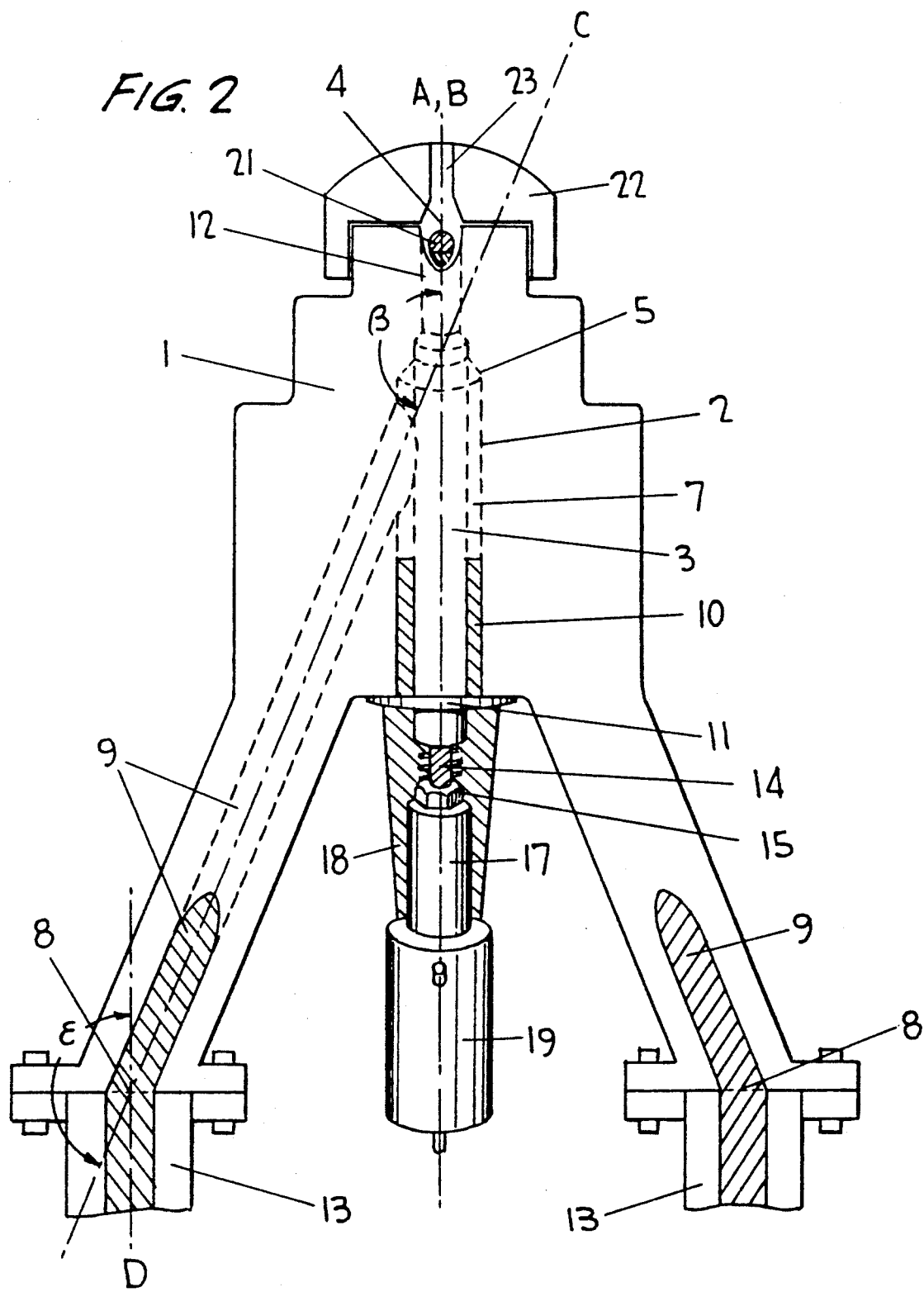
FIG. 2 is a view of the nozzle assembly of FIG. 1 taken in the plane perpendicular to that of FIG. 1 through longitudinal axis A of the nozzle body, and shown partially in section.

In FIG. 2, both nozzle inlets 8 and only 1 of bores 2 are shown in partial section, and it is apparent that the straight line infeed channel 9 which extends from the left nozzle input 8 to annular space 7 of the related bore 2 inclines below the plane of projection at an angle $\epsilon$ ranging from 0° to $-10°$, whereas the other, right, straight line infeed channel 9 extends beyond the plane of projection at the complementary angle $\epsilon$ ranging from 0° to $+10°$. And, longitudinal axes A and D or the projection of the latter in FIG. 1 coincide, in fact, only by chance in the plane of projection. In FIG. 2, longitudinal axes A and B or the projection of the latter coincides now in the plane of projection.

Although only two plasticizing units and two related bores 2 are illustrated more than two may be provided without departing from the invention.

According to the invention at least one of the nozzle inlets from a plasticizing unit is fed with a plasticizing plastic component, and the outlet of this plasticizing unit is coupled directly to the related nozzle inlet. In such manner, both the path of the corresponding plasticized plastic component to the mold cavity and also the number of unavoidable directional changes of this path are minimized, a feature that further reduces the causes for possible energy losses in the flowing plastic component. And, the longitudinal axis of the connection extending in a straight line an optionally attached to the plasticizing unit, and the longitudinal axis of the infeed channel extending from the nozzle inlet coupled to the plasticizing unit directly or by means of the straight line connection, substantially align with one another.

The shutoff valves of the invention may comprise slide valves or rotary disk valves located in bores each extending along a straight line toward the common nozzle outlet chamber. The closing position of the respective bore can be controlled and adjusted continuously and independently of the other shutoff valve element, thereby giving rise to a more cost effective construction of the nozzle which likewise avoids a change in direction of the respective shut-off valve and thus eliminates one source of energy loss. And, outside the actual opening and closing movements of the valve no significant turbulent flows of the respective plastic component flow through or are generated at the shutoff valves.

The shutoff valves can be in the form of shutoff valve needles which respectively reciprocate in the nozzle body bores. Each needle valve can be independently controlled and maintained as by means of a separate sliding drive means.

Such drive means may have a mechanical spring arrangement that generates a prestress relative to the injection pressure of the respective plastic component prevailing in the outstream portion of the valve at the common nozzle outlet chamber. The drive of each needle valve may be in the form of a piston-cylinder arrangement that operates against a spring force and can be loaded either on one side or on both sides.

Also, the piston-cylinder arrangement may be provided for fixing the maximum stroke of the shut-off valve needle by using, for example, a thread bolt and lock nut arranged between the piston and the needle valve. The piston of the piston-cylinder arrangement is coaxial with its associated shutoff valve.

All shutoff valve needles are prevented from rotating about the respective longitudinal axes such that their chamfered tip ends facing the common nozzle outlet chamber in the closed position of the valves project simultaneously without interference. And, one or more plastic component flowing through the common nozzle outlet chamber is thereby free of residue from one or more of the previously extruded plastic components which may have accumulated in front of the shaped tip end of the needle valves in the closed condition.

For a nozzle body having two bores containing needle shutoff valves, the bores are in a V-shaped arrangement symmetrical to the central, longitudunal axis of the body and have an included wedge angle $\epsilon$ of up to 40°.

Obviously, many other modifications and variations of the present invention are made possible in light of the above teachings. If is therefore to be understood that within the scope of the appended claims the invention may be practiced otherwise than as specifically described.

What is claimed is:

1. A nozzle for an injection molding machine comprising, a nozzle body containing a common nozzle outlet chamber and at least a pair of angularly related elongated bores, outfeed channels extending from said bores and communicating with said outlet chamber, an infeed channel connected to each of said bores, each said infeed channel having a nozzle inlet, a separate plasticizing unit coupled to each said inlet for delivering plasticized materials to said chamber, an independently operable shutoff valve operating in each said bore for controlling the flow of plasticized material from each of said bores to said chamber, each said infeed channel extending along a straight line from its said inlet to said respective bore, and each said outfeed channel extending along a straight line from each said respective bore to said chamber, the longitudinal axes of each said plasticizing unit and said infeed channel connected thereto forming an angle $\gamma$ of 140° to 180°, the longitudinal axes of each said infeed channel and said outfeed channel associated therewith forming an angle $\beta$ of 140° to 180°, and the longitudinal axes of each said outfeed channel and of said chamber forming an angle $\alpha$ of 140° to 180°.

2. The nozzle according to claim 1, wherein each said shutoff valve operating in each said bore comprises a slide valve for sliding movement within said respective bore between open and closed positions.

3. The nozzle according to claim 1, wherein said outfeed channels are respectively coaxial with said respective bores from which said outfeed channels extend.

4. The nozzle according to claim 2, wherein separate reciprocating drive means are coupled to each of said slide valves to effect independent operation of said valves.

5. The nozzle according to claim 4, wherein said drive means are spring bias coupled to said respective slide valves for cushioning sliding movement of said valves.

6. The nozzle according to claim 4, wherein said drive means comprise a piston and cylinder unit.

7. The nozzle according to claim 4, wherein said drive means are thread coupled to said respective slide valves for adjusting the maximum stroke of said valves.

8. The nozzle according to claim 7, wherein said drive means comprise a piston and cylinder unit, each said piston being coaxial with said respective slide valve.

9. The nozzle according to claim 1, wherein each said bore contains a sleeve guide for said respective slide valve, said sleeve guide comprising a replaceable wear bushing.

10. The nozzle according to claim 1, wherein means are provided on said body in engagement with said respective valves for avoiding rotation of said valves about their respective axes.

11. The nozzle according to claim 9, wherein tip ends of said valves are chamfered to avoid interference between said ends in a valve closed position of each said valve.

12. The nozzle according to claim 1, wherein the axes of said angularly related bores lie at an angle $\epsilon$ of up to 40°, and wherein said infeed channels are inclined relative to the axis of symmetry of said body by up to 10°.

* * * * *